Figure 1:
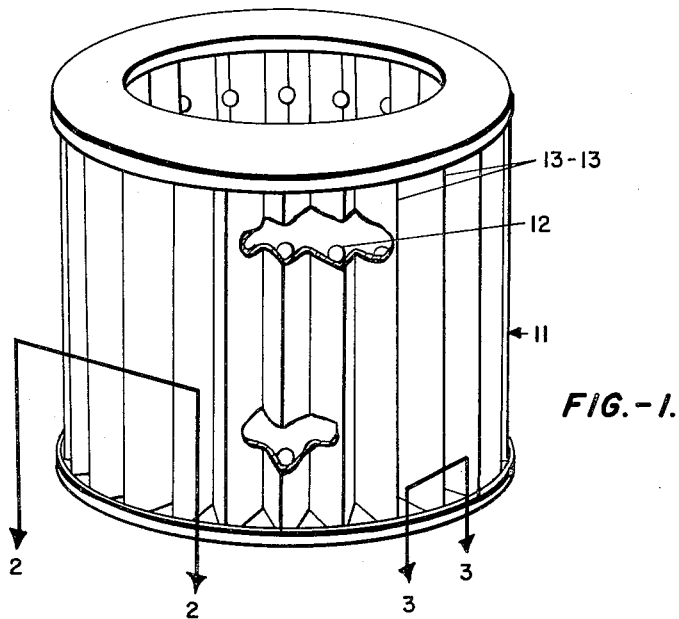

July 10, 1962 C. S. GILES ETAL 3,043,739
FILTER ELEMENT FORMED OF PLEATED PAPER
Filed Dec. 31, 1958

3,043,739
FILTER ELEMENT FORMED OF PLEATED PAPER
Cary S. Giles, Lexington, and Edward W. Merrill, Belmont, Mass., assignors to W. R. Grace & Co., Cambridge, Mass., a corporation of Connecticut
Filed Dec. 31, 1958, Ser. No. 784,114
5 Claims. (Cl. 156—283)

This invention relates to filter elements of a type which may be used for removing contaminants from either liquids or gases. More particularly it relates to the pleated paper filter elements which are widely used today with internal combustion engines for removing dirt either from the motor oil or from the intake air of the engine.

Pleated filters are made from soft, porous paper or other porous fibrous sheet material, usually impregnated with a phenolic resin. The resin imparts stiffness and wet strength to the paper, as well as increasing its resistance to the impact of the gas or liquid and the dirt particles.

Paper filters are characterized by very high efficiency, i.e. they will remove a high proportion, initially over 95% of the total contaminant present in the liquid or gas being filtered. The efficiency may build up to 100% as the dirt accumulated by the filter reduces the pore size of the paper. When the pores become so filled up that the filter no longer allows the passage of a sufficient amount of gas or liquid, the filter must be replaced. The amount of dirt which can be held by the paper before replacement is necessary is termed the "capacity" of the filter. The resistance of the filter to the passage of gas or liquid is referred to in the trade as "restriction." Both capacity and restriction play an important part in determining the useful life of a paper filter.

The capacity of a paper filter is directly related to the surface area of the paper. In order to provide as large an area as possible within the limited space ordinarily available to the filter, it is customary to fold the resin-impregnated paper strip into a multiplicity of pleats. After pleating, the resin is cured in order to set the pleats and to stiffen the paper. The resin may be only partially cured at this stage, leaving the paper sufficiently flexible so that it can be manipulated and cure may be completed by heating the assembled filter element. The ends of the pleated paper strip are cemented or otherwise secured together to form a cylinder with the pleats extending lengthwise of the cylinder.

The filter element of which the pleated paper cylinder forms a part may include one or more supporting members for the pleated paper. In some cases, for example in certain oil filters, the support may take the form of a central core or cylinder of perforated sheet metal. In air filters, spaced, concentric cylinders formed from wire screen or perforated sheet metal are frequently used as supporting elements on both the inner and the outer circumference of the pleated paper cylinder.

The filter element is ordinarily sealed at both ends by a rubbery gasket which ensures that the gas or liquid being filtered will pass through the pleated paper. In one type of air filter assembly which has found widespread acceptance, the ends of the pleats and the exposed edges of the wire screens or perforated metal sheets are embedded at both the top and bottom of the filter element in a molded plastic closure, ordinarily formed from a vinyl polymer of the plastisol type. The molded plastic closure is cured by heating the filter element after assembly has been completed. This type of closure not only serves as a seal but also anchors the various parts of the filter element in place.

The restriction of a paper filter is determined by a number of factors among which may be enumerated porosity of the paper, amount and nature of the impregnant, the closeness with which the pleats are packed within the filter element, and even the design of the supporting members. The initial restriction of the filter must be kept as low as possible in order to allow a sufficient flow of liquid or gas and to make possible the maximum useful life for the filter. Restriction inevitably increases as dirt accumulates in the pores of the paper, to the point where replacement of the filter becomes necessary.

One of the most serious problems encountered in the use of pleated paper filters is the tendency of the pleats to collapse, that is for the sides of the pleats to be pinched together due to the pressure differential across the filter as the liquid or gas passes through the paper. This tendency becomes more pronounced as the restriction of the filter increases, with the resulting increased pressure differential between the intake and the outlet side of the filter element. Collapse of even a single pleat makes a substantial amount of paper surface unavailable for filtering and puts an increased load on the remaining pleats. Collapse of any considerable number of pleats causes a serious drop in both capacity and useful life of the filter.

Recent developments in automotive design have accentuated the problem of pleat collapse in pleated paper filters which are used to filter the intake air of the engine. As the hoods of automobiles have become lower, the space available for the air filters has been more and more restricted. The height of the filters has been greatly reduced as a result, the filters for the newer cars frequently being only half the height of those formerly used. In order to retain the same area of paper surface, and consequently the same capacity, other changes have had to be made. The diameter of the filter element has been enlarged within the limits imposed by available space, and the number of pleats in the filter paper has been increased. This, too, is possible only within limits, for as it has been pointed out above, the restriction of the filter increases as the pleats are more closely packed together within the filter element. In some cases, a more porous paper has been used in order to counteract the increased restriction caused by closer packing of the pleats. In a further attempt to maintain the available surface area, the depth of the pleats has been increased, often to twice that of the pleats in the older filters. Both the more porous paper and the deeper pleats decrease the stiffness and structural strength of the pleated paper element, however, and increase its tendency towards pleat collapse. It has been necessary in manufacturing the new lower height paper filters, therefore, to compromise between adequate surface area for filtering on the one hand and sufficient stiffness to prevent pleat collapse on the other. In many cases, the compromise has not been entirely successful from either point of view.

It is an object of our invention to produce a pleated paper filter element which has little or no tendency towards pleat collapse during use. A further object of our invention is to produce a pleated paper filter element in which additional stiffness and structural strength are imparted to the paper pleats, thereby preventing the sides of the pleats from approaching one another due to the pressure exerted on the paper by the liquid or gas being filtered. A still further object of our invention is to impart sufficient stiffness to the pleated paper so that even the deeper pleats currently used in carburetor air filters will be prevented from collapsing during use. In addition, it is an object of our invention to provide a spacing means between the pleats, whereby the sides of the pleats are mechanically restrained from approaching each other when pressure is exerted on the paper.

It has been proposed in the past to insert a mechanical separator into the filter element in the form of a wire bent in zig-zag shape to conform to the cross-sectional design of the paper pleats. Such a wire is fitted into the filter element and adhesively attached to the pleated paper at some point between the top and bottom closures of the filter element, thereby preventing the sides of the pleats from approaching each other when placed under pressure. This expedient, while quite effective in preventing pleat collapse, is more of a laboratory curiosity than a commercial possibility due to the difficulties inherent in the operation of fitting a bent wire into the proper position with relation to the pleats. Other pleat-spacing devices which have been used in certain types of filters, i.e. pleated or corrugated spacer strips, are too bulky to be of practical use in an automotive filter where space is at such a premium.

We have discovered that the pleats in a pleated paper filter element may be reinforced and may also be separated from one another so that pleat collapse is prevented by means of bead-shaped spacing means adhesively anchored between the pleats, preferably on the outlet side of the filter.

Figure 2:
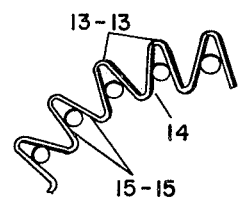
Figure 3:
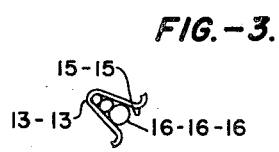

Our invention will be more clearly understood by reference to the accompanying drawings, in which FIGURE 1 is an elevation, partly in section, showing a pleated paper filter element of the type used for filtering the intake air of internal combustion engines; FIGURE 2 is a fragmental section of line 2—2 of FIGURE 1 showing the relative position of the spacing beads and their location between adjacent pleats; and FIGURE 3 is a fragmental section of lines 3—3 of FIGURE 1, showing the use of a plurality of beads of different diameters.

With further reference to FIGURE 1 of the drawings, 11 is a cylinder formed of a pleated porous filter paper and 12 indicates spacing beads disposed between pleats 13—13 of the pleated paper. In FIGURE 2, the beads 12 are shown disposed between sides 15—15 of pleats 13—13 on the outlet side 14 of the filter element. It is apparent from FIGURE 2 that when air pressure is exerted from the intake to the outlet side of the filter element, the beads 12 will act as spacing means to prevent the movement of sides 15—15 of the pleats 13—13 toward each other, thus preventing collapse of the pleats. FIGURE 3 shows a plurality of beads 16—16—16, arranged in order of increasing diameter, between the sides 15—15 of pleats 13—13.

The bead-shaped spacing elements are dropped into the pleats either at the time the pleats are formed or at any other suitable time before the filter element is assembled. One or more beads may be used as desired for each pleat. The size and number of the beads to be used is governed by the amount of space which it is desired to maintain between adjacent pleats. Beads of different diameters are advantageously used together in order to obtain reinforcement against collapse under severe pressure drop across the pleated filter. Beads of varying diameter may be arranged either in order of increasing diameter, as shown in FIGURE 3, or in overlapping relationship or in any other desired relationship.

The spacing beads may be formed of any relatively hard material such as glass, metal or resin, in order that the beads will not be compressed during use of the filter and therefore will be able to keep the pleats spaced from each other by the desired distance. The beads must also be of such a nature or treated in such away that they will stick firmly to the paper, and thereby become fixed in the proper position within the pleats. Thus the beads may be made of certain resins which become tacky when heated, and the pleated paper may be heated with the beads in place in order to form an adhesive bond. Alternatively, beads which have been made of glass, metal or other non-adhesive substance may be coated with an adhesive before the beads are placed in position between the pleats of the paper.

While we do not wish to limit our invention to any particular materials, we have found that certain thermosetting resins are particularly adapted for use as spacing beads. These resins, among which may be enumerated certain phenol-formaldehyde, urea-formaldehyde and epoxy-based thermosetting resins, on heating undergo a period of softening or flow before setting to their final hard, non-yielding condition.

In carrying out a preferred form of our invention, spacing beads of a heat-softening thermosetting resin are dropped between the pleats of a filter paper strip as it leaves the pleater. The pleated strip is then advanced into a heating zone, in which the beads first soften and adhere to the pleated paper, and then set to a firm, non-yielding condition. The pleated strip with its firmly attached spacing elements is then formed into a cylinder and the filter element is assembled as described above.

Other resins may also be used to form spacing beads according to our invention. For example, the beads may be formed from thermoplastic rather than from thermosetting resins, provided the softening temperature of the thermoplastic resin is well above the temperature at which the filter elements are used. The pleated paper containing spacing beads of such a thermoplastic resin, for example polystyrene or polyvinyl acetate, is passed through a heating zone at the proper temperature so that the beads soften just enough to adhere to the paper, but do not lose their shape to any substantial degree. On cooling, the beads are hard enough to act as stiffening and spacing means to prevent pleat collapse during use of the filter. Alternatively, the beads may be formed of a thermosetting resin of the type described above, the beads being already in their thermoset condition when applied to the pleated paper, or they may be formed of glass, stainless steel or other hard material. In this case, a suitable adhesive is applied to the beads immediately before they are placed between the pleats of the paper, for the purpose of securing the beads of resin in their proper positions between the pleats.

We prefer to apply the beads to the side of the cylinder of pleated paper which is to act as the outlet side 14 of the filter element, since in this position, as may be seen clearly from FIGURE 2 of the drawing, the beads 12 are disposed between the sides 15—15 of the pleats which would tend to approach each other under pressure of the air or gas being filtered. In this position, the maximum spacing effect may be obtained from the beads. We may, however, place the beads between pleats on the inlet side of the cylinder of pleated paper. In this position, the beads serve as an anchoring or restraining means, which keeps the pleats from moving toward each other when placed under pressure, thus preventing collapse of the pleats. In either position, the bead spacers serve to stiffen and strengthen the pleated paper, and thus to increase the capacity and useful life of the filter.

While our invention has been shown in the accompanying drawings as applied to a conventional air filtering unit, it is apparent that it may be applied with equal success to any type of filter which includes a pleated paper filtering element.

We claim:

1. In a process for the manufacture of pleated paper filter elements which includes the steps of folding a resin impregnated paper strip into a multiplicity of pleats, heating the pleated strip for a time and a temperature sufficient to at least partially cure the resin thereby setting the pleats and stiffening the paper and thereafter forming the pleated and cured strip into cylindrical filter elements with the pleats extending parallel to the principal axis of the cylinder, the process of reinforcing the pleats against collapse when the pleated filter element is used as a filter which comprises providing a plurality of relatively hard and non-deformable spherical bead-like units said units having at least a surface that becomes adhesive upon being heated to the temperature to which the paper strip is heated and said units having a diameter that is substantial relative to the spacing of the pleats, inserting at least one of said units between each successive pleat on one side of the paper strip after the pleat has been formed in said paper strip and before the strip has been heated to cure the resin contained therein, whereby when the strip is heated each of said units will adhesively secure to the sides of the pleat in which it is inserted and thereby reinforce said pleat against collapse.

2. The process of claim 1 wherein the substantially spherical bead-like units are of varying diameter and a plurality of units are placed in each pleat.

3. The process of claim 1 wherein the substantially spherical bead-like units are formed of a thermoplastic resin having a melting point in excess of the maximum temperature to which the strip is heated.

4. The process of claim 1 wherein the substantially spherical bead-like units are formed of a thermosetting resin.

5. The process of claim 1 wherein the substantially spherical bead-like units are formed of an infusible material and the surface of each of said units is coated with a heat softening adhesive material.

References Cited in the file of this patent

UNITED STATES PATENTS

| | | |
|---|---|---|
| 2,372,865 | Taylor | Apr. 3, 1945 |
| 2,569,243 | Kovacs | Sept. 25, 1951 |
| 2,598,210 | Beacham | May 27, 1952 |
| 2,732,031 | Rabbitt | Jan. 24, 1956 |
| 2,836,302 | Buckman | May 27, 1958 |
| 2,915,426 | Poelman | Dec. 1, 1959 |

FOREIGN PATENTS

| | | |
|---|---|---|
| 727,398 | Great Britain | Mar. 30, 1955 |
| 750,099 | Great Britain | June 6, 1956 |
| 1,111,568 | France | Nov. 2, 1955 |
| 148,080 | Australia | Jan. 12, 1950 |